United States Patent [19]

Ichiki et al.

[11] 3,769,186

[45] Oct. 30, 1973

[54] METHOD OF TREATING WASTE WATER THROUGH ELECTROLYSIS

[75] Inventors: Minoru Ichiki; Masahito Ishii, both of Tokyo, Japan

[73] Assignee: Mitsui Mining & Smelting Co., Ltd., Tokyo, Japan

[22] Filed: June 14, 1972

[21] Appl. No.: 263,391

[30] Foreign Application Priority Data
June 2, 1971 Japan.............................. 46/038478

[52] U.S. Cl.................................. 204/149, 204/130
[51] Int. Cl............................ C02c 5/12, C02b 1/82
[58] Field of Search..................... 204/149, 152, 130, 204/96

[56] References Cited
UNITED STATES PATENTS

| | | | |
|---|---|---|---|
| 937,210 | 10/1909 | Harris | 204/149 |
| 943,187 | 12/1909 | Hartman | 204/149 |
| 1,544,052 | 6/1925 | Avery | 204/149 |
| 3,082,160 | 3/1963 | Sabins | 204/149 X |
| 3,518,174 | 6/1970 | Inoue | 204/149 |
| 2,700,647 | 1/1955 | Welcker | 204/149 |

*Primary Examiner*—John H. Mack
*Assistant Examiner*—A. C. Prescott
*Attorney*—Woodhams, Blanchard & Flynn

[57] ABSTRACT

A method of treating waste water which is characterized by the purification of the industrial waste water containing at least one member of the group consisting of oil, emulsion, heavy-metal ion and suspended solid matter through electrolysis employing an aluminum alloy as the anode.

5 Claims, No Drawings

METHOD OF TREATING WASTE WATER THROUGH ELECTROLYSIS

BACKGROUND OF THE INVENTION a. Field of the Invention

The present invention relates to a method of purifying the industrial waste water containing oil, emulsion, heavy-metal ion, suspended solid matter, etc. through electrolysis.

b. Description of the Prior Art

The idea of treating a waste water by electrolysis to precipitate and separate the baneful substances therefrom has heretofore been conceived. Various attempts to realize this idea, however, have proved to be fatally defective in that because of the anode for use in the conventional electrolysis being consisting of aluminum with having a composition of more than 99.7% Al, less than 0.2% si, less than 0.2% Fe and less tahn 0.01% Cu, each by weight (the first class of Japanese Industrial Standard) or more than 99.5% Al, less than 0.3% Si, less than 0.3% Fe and less than 0.02% Cu, each by weight (the second class of Japanese Industrial Standard), a passive-state film of oxide of the anode or slime comes to adhere to the surface of anode and the cell voltage ascends with the lapse of time, bringing about not only the operational hazard but also the waste of electric power and lowering of the treating efficiency of the apparatus to render it impossible to perform the treatment continuously.

SUMMARY OF THE INVENTION

The object of the present invention is to provide a method of electrolysis which eliminates the aforementioned defects of the prior art. To be precise, the present invention is to provide an improved method of electrolysis which renders it possible to perform the electrolysis continuously for a long period of time by checking the rise in cell voltage in the course of electrolysis by virtue of the application of the anode consisting of such material as being free from adhesion of a passive-state film arising from oxidation of the anode, with a view to settling the foregoing troubles ascribable to said rise in cell voltage through improvement of the material to serve as the anode for electrolysis.

Paying their attention to the fact that the strength of the passive-state oxide film of aluminum considerably varies with the elements added to said aluminum, the inventors of the present invention have conducted a series of studies on the elements to be added to aluminum, which culminated in the finding that such a material for electrode as consisting of an aluminum alloy comprising such additive element as indium, gallium, etc. belonging to the aluminum family brings about no rise in voltage during electrolysis and is servable continuously so that the foregoing troubles may be settled at a stroke. The present invention has been achieved on this finding.

DESCRIPTION OF THE PREFERRED EMBODIMENTS

The present invention relates to a method of purifying the industrial waste water containing oil, emulsion, heavy-metal ion, suspended solid matter, etc. through electrolytic treatment, which is characterized by the employment of an aluminum alloy comprising an appropriate quantity of additive element such as indium, gallium, etc. belonging to the aluminum family for the anode.

The effect of addition of such an element as indium, gallium, etc. belonging to the aluminum family is displayed in the following way: in case an aluminum alloy comprising such additive elements is used as the anode, the film of oxidized anode comes to be so fragile that it falls off with the lapse of time to expose a renewed surface of anode incessantly; the slime or the like adhering to the surface of the electrode also comes off simultaneously with the exfoliation of said oxide film; and, as a result, the rise in voltage during electrolysis can be prevented and a continuous electrolysis for a long period of time can be expected.

As to the quantity of such an element as indium, gallium, etc. belonging to the aluminum family to be added for this purpose, application of a trifling quantity suffices to bring about an excellent effect and the optimum range is from 0.01% to 1% of the aluminum alloy: in case said quantity is less than 0.01%, the desired effect is infeasible, while in case it exceeds 1%, there is brought about a local cell and the electrode is wasted due to self-discharge even when no electric current is applied.

As the element to bring about a multiplied effect through joint application with indium or gallium, there are alkali metals (belonging to Group IA of Table for Periodic Law) such as lithium, sodium, etc., alkaline earth metals (belonging to Group IIA of Table for Periodic Law) such as magnesium, calcium, etc. and zinc family (belonging to Group IIB of Table for Periodic Law) such as zinc, and one or more than two of these elements may be added together with indium or gallium.

The appropriate quantity of the alkali metals such as lithium, sodium, etc. to be thus added is in the range of from 0.01 to 0.1%: in case said quantity exceeds 0.1%, there is brought about a local cell and the electrode is wasted due to self-discharge even when no electric current is applied, while in case it is less than 0.01%, the desired effect is infeasible.

The appropriate quantity of the alkaline earth metals such as magnesium, calcium, etc. to be added for said purpose is in the range of from 0.01 to 5%: in case said quantity exceeds 5%, there is brought about a local cell and the electrode is naturally wasted in the same manner as in the case of alkali metals, while in case it is less than 0.01%, the addition is fruitless. The appropriate quantity of zinc to be added for said purpose is in the range of from 0.05 to 30%: addition of zinc in excess of 30% aggravates the natural waste of the electrode ascribable to the local cell, while addition thereof by less than 0.05% is fruitless.

Further, on the occasion of adding indium and gallium as set forth above, a part of these elements may be replaced with tin. The appropriate quantity of tin to be added in this case is in the range of from 0.05 to 10%: addition of tin in excess of 10% aggravates the natural waste ascribable to the local cell, while addition thereof by less than 0.05% makes the substitution fruitless.

As will be understood from the above description, the present invention relates to a method of treating the waste water through electrolysis by employing an aluminum alloy comprising specific components for the anode.

As to the disposition of the cathode plates and anode plates in application of the method of the present invention, it will do either to arrange both electrode plates perpendicularly as has heretofore been most popular, or to arrange the anodes perpendicularly while disposing the cathodes at right angles to said anodes.

Inasmuch as the application of the method under the present invention to the electrolytic treatment of waste waters containing oil, emulsion, heavy-metal ion, suspended solid matter, etc. checks the rise in cell voltage said cathode and anode being disposed to be 80 m/m apart from each other. The electrolysis was continuously performed by feeding said waste water through one end of the upper part of this electrolytic cell while discharging the purified water through the bottom of the opposite side at the rate of 10 l/min and regulating the bath electric-current to be 10A, whereby the change of ratio of rise in cell voltage with the lapse of time was measured. The result was as shown in Table-1.

TABLE 1

| | Additive element (percent) | | | | | | Ratio of rise in cell voltage* | | | |
|---|---|---|---|---|---|---|---|---|---|---|
| | In | Ga | Sn | Zn | Li | Mg | 1 day after | 5 days after | 10 days after | 20 days after |
| Example under the present invention | 0.5 | | | | | | 0.99 | 0.92 | 0.81 | 0.83 |
| | | 0.3 | | | | | 1.00 | 1.00 | 1.01 | 1.01 |
| | .1 | | | 5 | | | 1.02 | 1.05 | 1.01 | 1.02 |
| | .1 | .1 | | 5 | | | 1.00 | .99 | 1.00 | 1.00 |
| | .03 | | | 7 | | 3 | .99 | 1.02 | 1.00 | 1.02 |
| | .03 | | 5 | | | | 1.02 | 1.03 | 1.03 | 1.05 |
| | .03 | | .1 | 3 | | 5 | .99 | .97 | 1.00 | 1.12 |
| | .01 | | | | | | 1.25 | 1.36 | 1.36 | 1.92 |
| | .01 | | | 3 | | Ca .1 | 1.14 | 1.10 | 1.25 | 1.16 |
| | .01 | | | 3 | 0.05 | | 1.11 | 1.31 | 1.31 | 1.32 |
| Comparative example | (**) | | | | | | 2.22 | 6.83 | 10.24 | 14.01 |
| | (**) | | 2 | 7 | | | 2.80 | 3.88 | 7.25 | 8.95 |

*The ratio was calculated by taking the voltage at the start of charging with electricity as 1.00.
**Nonaddition.

during electrolysis to thereby render it possible to perform electrolysis continuously for a long period of time, the industrial utility value of the present method is tremendous.

Hereunder will be given some examples embodying the present invention.

EXAMPLE 1

By employing an electrolytic cell as described below, an oil-containing waste water (mean oil content: 280 ppm) of emulsion-type being discharged from a foundry was continuously treated by electrolysis.

The electrolytic cell measuring 600 m/m wide × 700 m/m long × 700 m/m deep was one made of polyvinyl chloride, and was provided with cathode consisting of iron plate (550 m/m × 600 m/m × 2 m/m thick) and anode consisting of plate-shaped aluminum alloy (400 m/m × 600 m/m × 10 m/m thick) prepared by adding the metals shown in the following Table-1 to the ground metal comprising 99.7 percent of aluminum, As is evident from Table-1 above, in case the anode consists of an aluminum alloy containing indium or gallium even in a trivial quantity, the rise in cell voltage is quite insignificant.

EXAMPLE 2

A waste water (analysis data: Zn 0.45 ppm, Cu 3.4 ppm, Ni 8.5 ppm, Cr 3.0 ppm) being discharged from a plating shop was subjected to continuous electrolysis by means of an electrolytic cell which was practically the same as that in Example 1 in construction as well as disposition of electrodes and equipped with anode consisting of an aluminum alloy ingot (measuring 20 m/m × 30 m/m × 100 m/m) as shown in the following Table-2 which was packed in a perforated, insoluble case. The electrolysis was performed continuously while discharging the purified water at the rate of 10 l/min and regulating the electric current to be 10A, whereby the ratio of rise in cell voltage was measured. The result was as shown in Table-2.

TABLE 2

| | Additive element (percent) | | | | | | Ratio of rise in cell voltage* | | | |
|---|---|---|---|---|---|---|---|---|---|---|
| | In | Ga | Sn | Zn | Mg | Li | 1 day after | 5 days after | 10 days after | 20 days after |
| Example under the present invention | 0.5 | | | | | | 1.0 | 1.0 | 1.0 | 1.0 |
| | | 0.3 | | | | | 1.2 | 1.3 | 1.4 | 1.4 |
| | .1 | | | 5 | | | 1.2 | 1.3 | 1.8 | 1.9 |
| | .1 | .1 | | 5 | | | 1.2 | 1.3 | 1.4 | 1.5 |
| | .03 | | | 7 | 3 | | 1.3 | 1.5 | 1.8 | 2.0 |
| | .03 | | 5 | | | | 1.2 | 1.6 | 1.9 | 2.2 |
| | .03 | | 0.1 | 3 | 5 | | 1.4 | 1.6 | 2.1 | 2.6 |
| | .01 | | | | | | 1.2 | 1.2 | 1.4 | 1.6 |
| | .01 | | | 3 | Ca .1 | | 1.5 | 1.4 | 1.4 | 1.4 |
| | .01 | | | 3 | | 0.05 | 1.5 | 1.5 | 1.8 | 2.1 |
| Comparative example | (**) | | | | | | 13.4 | 14.6 | 14.9 | 15.4 |
| | (**) | | 2 | 7 | | | 12.6 | 13.6 | 13.8 | 13.8 |

*The ratio was calculated by taking the voltage at the start of charging with electricity as 1.00.
**Nonaddition.

As is evident from Table-2 above, in case the anode consists of an aluminum alloy containing indium or gallium even in a trivial quantity, the rise in cell voltage is quite insignificant.

What is claimed is:

1. A method of electrolytically purifying industrial waste water containing at least one member of the group consisting of oil, emulsion, heavy metal ion and suspended solid matter, wherein an aluminum alloy prepared by adding to aluminum from 0.01 to 1 weight-percent of at least one other element belonging to the aluminum family is employed as the anode.

2. A method of electrolytically purifying industrial waste water according to claim 1, wherein said aluminum alloy employed as the anode also contains from 0.01 to 0.1 weight-percent of at least one element belonging to the alkali family.

3. A method of electrolytically purifying waste water according to claim 1, wherein said aluminum alloy employed as the anode also contains from 0.01 to 5 weight-percent of at least one element belonging to the alkaline earth family.

4. A method of electrolytically purifying waste water according to claim 1, wherein said aluminum alloy employed as the anode also contains from 0.05 to 30 weight-percent of zinc.

5. A method of electrolytically purifying waste water according to claim 1, wherein said aluminum alloy employed as the anode also contains from 0.05 to 10 weight-percent of tin.

* * * * *